(12) United States Patent
Jafek

(10) Patent No.: US 11,893,740 B2
(45) Date of Patent: Feb. 6, 2024

(54) MOVING OBJECT DETECTION FROM A MOVING CAMERA

(71) Applicant: Aurora Flight Sciences Corporation, Manassas, VA (US)

(72) Inventor: Benjamin Jafek, Somerville, MA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 229 days.

(21) Appl. No.: 17/246,129

(22) Filed: Apr. 30, 2021

(65) Prior Publication Data

US 2022/0012886 A1    Jan. 13, 2022

Related U.S. Application Data

(60) Provisional application No. 63/048,807, filed on Jul. 7, 2020.

(51) Int. Cl.
   *G06T 7/11*    (2017.01)
   *G06T 7/174*   (2017.01)
   (Continued)

(52) U.S. Cl.
   CPC .............. *G06T 7/11* (2017.01); *G06T 3/0006* (2013.01); *G06T 7/174* (2017.01); *G06T 7/20* (2013.01);
   (Continued)

(58) Field of Classification Search
   CPC ......... G06T 7/11; G06T 3/0006; G06T 7/174; G06T 7/20; G06T 2207/10032;
   (Continued)

(56) References Cited

U.S. PATENT DOCUMENTS 11,170,524 B1 * 11/2021 Mishra .................... G06T 5/005
11,216,954 B2 *  1/2022 Peled .................. G06F 18/2155
(Continued)

OTHER PUBLICATIONS

May et al., "Moving Target Detection for Sense and Avoid Using Regional Phase Correlation," 2013 IEEE International Conference on Robotics and Automation (ICRA); May 6-10, 2013, Karlsruhe, Germany, 6 pages.
(Continued)

*Primary Examiner* — Oneal R Mistry
*Assistant Examiner* — Vaisali Rao Koppolu
(74) *Attorney, Agent, or Firm* — MH2 Technology Law Group LLP

(57) ABSTRACT

A method includes identifying a first image that is captured at a first time. The method also includes segmenting the first image into a plurality of first image portions. The method also includes identifying a second image that is captured at a second time. The method also includes segmenting the second image into a plurality of second image portions. The method also includes comparing one of the plurality of first image portions and a corresponding one of the plurality of second image portions. The method also includes determining a difference between the first image and the second image based at least partially upon the comparison. The method also includes transforming the first image into a transformed first image based at least partially upon the difference.

26 Claims, 10 Drawing Sheets

(51) Int. Cl.
  *G06T 3/00* (2006.01)
  *G06T 7/20* (2017.01)
(52) U.S. Cl.
  CPC ............... *G06T 2207/10032* (2013.01); *G06T 2207/20224* (2013.01); *G06T 2207/30181* (2013.01); *G06T 2207/30236* (2013.01); *G06T 2207/30241* (2013.01)
(58) Field of Classification Search
  CPC . G06T 2207/20224; G06T 2207/30181; G06T 2207/30236; G06T 2207/30241; G06T 2207/10016; G06T 2207/20021; G06T 2207/30252; G06T 7/32; G06T 7/254
  See application file for complete search history.

(56) References Cited

U.S. PATENT DOCUMENTS

| | | | |
|---|---|---|---|
| 2011/0013016 A1* | 1/2011 | Tillotson | G01N 21/41 340/963 |
| 2011/0142283 A1* | 6/2011 | Huang | G06T 7/254 382/103 |
| 2013/0077821 A1* | 3/2013 | Chen | G06T 3/4053 382/103 |
| 2015/0310296 A1* | 10/2015 | Seki | G06T 7/20 382/195 |
| 2016/0171715 A1* | 6/2016 | Matson | G06T 3/4076 382/103 |
| 2020/0334832 A1* | 10/2020 | Den Hollander | G06T 7/215 |
| 2021/0042896 A1* | 2/2021 | Peterson | G06T 7/20 |

OTHER PUBLICATIONS

Molloy et al., "Detection of aircraft below the horizon for vision-based detect and avoid in unmanned aircraft systems," Journal of Field Robotics, vol. 34, No. 7, May 16, 2017, 14 pages.

Schubert et al., "Robust Registration and Filtering For Moving Object Detection In Aerial Videos," 22nd International Conference on Pattern Recognition, IEEE Computer Society, Aug. 24, 2014, 6 pages.

Chen, et al., "Object-Level Motion Detection from Moving Cameras," IEEE Transactions on Circuits and Systems for Video Technology, 2015, https://www.researchgate.net/publication/305037541) 10 pages).

"Foreground detection," Wikipedia, 2021, https://en.wikipedia.org/wiki/Foreground_detection.

Rosenbrock, "The Canny Edge Detector," blog post, Zero-parameter, automatic Canny edge detection with Phython and OpenCV—PyImage Search, downloaded on Apr. 30, 2021 from https://www.pyimagesearch.com/2015/04/06/zero-parameter-automatic-canny-edge-detection-with-python-and-opencv/, (2015) 46 pages.

Fefilatyev et al., "Horizon Detection Using Machine Learning Techniques," IEEE Computer Society, Proceedings of the 5th International Conference on Machine Leanring and Application (ICMLA '06), 2006, 5 pages.

* cited by examiner

US 11,893,740 B2

MOVING OBJECT DETECTION FROM A MOVING CAMERA

CROSS-REFERENCE TO RELATED APPLICATIONS

This application claims priority to U.S. Provisional Patent Application No. 63/048,807, filed on Jul. 7, 2020, the entirety of which is incorporated by reference herein.

FIELD OF THE DISCLOSURE

The present disclosure is directed to foreground extraction. More particularly, the present disclosure is directed to detecting a moving object in a foreground of an image or video frame that is captured by a camera that is also moving.

BACKGROUND

Foreground extraction is any technique which allows an image's foreground to be extracted for further processing like object recognition, tracking, etc. A common assumption in foreground extraction is that the foreground includes moving objects, while the background is static. However, a common scenario that autonomous vehicles encounter is a moving background with independently moving foreground objects (e.g., when trying to detect moving objects with a camera that is attached to a vehicle that is itself moving). Traditional approaches fail in these scenarios because they classify everything as foreground because everything is moving. One traditional approach uses optical flow to detect objects that are moving differently than objects around them. However, this approach searches for motion in particular points, and motion between these points is not detected.

SUMMARY

A method is disclosed. The method includes identifying a first image that is captured at a first time. The method also includes segmenting the first image into a plurality of first image portions. The method also includes identifying a second image that is captured at a second time. The method also includes segmenting the second image into a plurality of second image portions. The method also includes comparing one of the plurality of first image portions and a corresponding one of the plurality of second image portions. The method also includes determining a difference between the first image and the second image based at least partially upon the comparison. The method also includes transforming the first image into a transformed first image based at least partially upon the difference.

A computing system is also disclosed. The computing system includes one or more processors and a memory system. The memory system includes one or more non-transitory computer-readable media storing instructions that, when executed by at least one of the one or more processors, cause the computing system to perform operations. The operations include identifying a first image that is captured at a first time. The first image is captured by a camera on an aircraft in flight. The operations also include segmenting the first image into a plurality of first image portions. The operations also include identifying a second image that is captured at a second time. The second image is captured by the camera on the aircraft in flight. The operations also include segmenting the second image into a plurality of second image portions. The operations also include comparing one of the plurality of first image portions and a corresponding one of the plurality of second image portions. The operations also include determining an affine translation between the one of the plurality of first image portions and the corresponding one of the plurality of second image portions based at least partially upon the comparison. The operations also include transforming the one of the plurality of first image portions into a transformed first image portion based at least partially upon the affine translation. The operations also include identifying a pixel in the transformed first image portion that differs from a corresponding pixel in the corresponding one of the plurality of second image portions by more than a predetermined amount. The operations also include determining that the pixel and the corresponding pixel represent a moving object.

In another example, the operations include identifying a first image that is captured at a first time. The first image is captured by a camera on a first aircraft in flight. The camera is pointed substantially straight down at a ground region below the first aircraft. The operations also include segmenting the first image into a plurality of first image portions. The operations also include identifying a second image that is captured at a second time. The second image is captured by the camera on the first aircraft in flight. The second time is after the first time. A time difference between the first and second times is less than 10 seconds. The operations also include segmenting the second image into a plurality of second image portions. The operations also include comparing one of the plurality of first image portions and a corresponding one of the plurality of second image portions. The operations also include determining an affine translation between the one of the plurality of first image portions and the corresponding one of the plurality of second image portions based at least partially upon the comparison. The operations also include transforming the first image into a transformed first image based at least partially upon the affine translation. The transformed first image comprises a prediction of what the second image will look like based at least partially upon the first image and the affine translation. The operations also include combining the transformed first image and the second image to produce a combined image. The operations also include identifying an area in the combined image that represents a difference between the transformed first image and the second image. The difference is greater than a predetermined amount. The operations also include identifying the area in the first image, the second image, or both.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
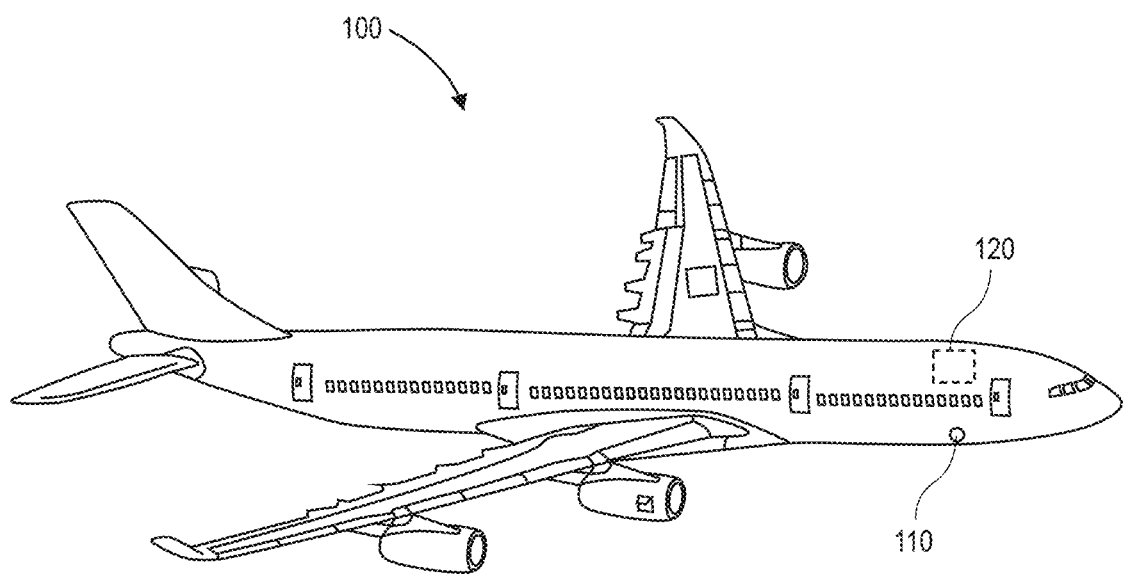
FIG. 1 illustrates a schematic view of an aircraft in flight, according to an example.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The system and method disclosed herein use binned phase correlation to detect moving objects in a series of images or frames of a video. The system and method may detect the moving object in the presence of a static background (e.g., when the camera that captures the image or video frame is stationary). The system and method may also detect the moving object in the presence of a dynamic/moving background (e.g., when the camera that captures the image or video frame is moving).

The system and method use phase correlation, which takes as an input two similar images, whose only difference is a small affine translation from the first image to the second image. For example, the first image is captured by a camera, and the camera is then moved a few inches up, right, down, or left (e.g., with no rotation and not forward or back), and then a second image is captured. The phase correlation then outputs a (dx, dy) affine translation between the two images. It is a quick calculation that uses the fast Fourier transform to compare the first and second images against each other. The system and method may be used to compare two images captured from a moving aircraft whose camera is pointed straight down and is capturing one or more images per second (relative to the speed of the aircraft). The images may also or instead be captured by non-aircrafts, such as a camera on a building.

In an example, two images may be captured at time T-1 and T. An affine translation may be determined between the two images. The affine translation may be used to transform the frame from time T-1 into time T (or vice versa). This new transformed image may be compared to the actual image captured at time T. Any pixels that differ (e.g., by more than a threshold) between the transformed image and the actual image are classified as moving. However, due to variations in distance from the aircraft to the ground, aircraft's attitude, camera angle, or rotation of the aircraft, this algorithm may return false positives (i.e., pixels identified as moving that are actually stationary). For example, if the aircraft rolls slightly, then the image may be transformed in a way that is not affine (e.g., image distortion). As a result, the stationary objects in the image will appear to move if there are only affine translations with which to compare them. To solve this problem, the image may be divided into smaller regions, and the phase correlation may be determined between the corresponding smaller regions.

In an example, such image distortion may be corrected by applying various types of transform for different types of image distortion. Image distortions may include, but are not limited to, scale distortion, rotational distortion, projective distortion, and barrel distortion.

FIG. 1 illustrates a schematic view of an aircraft 100 in flight, according to an example. The aircraft 100 may be or include an airplane, a helicopter, an unmanned aerial vehicle (e.g., a drone or satellite), a spacecraft, or the like. The aircraft 100 may include a camera 110. The camera 110 may be coupled the aircraft 100 and/or positioned within the aircraft 100. The camera 110 may be configured to capture one or more images. The camera 110 may also or instead be configured to capture a video (e.g., a continuous stream of images over time). In one example, the camera 110 may be configured to capture the video, and the images may be still frames taken from the video.

The aircraft 100 may be travelling in a substantially straight line while the images and/or video are captured. The aircraft 100 may also or instead be travelling at a substantially constant altitude while the images and/or video are captured. As a result, an object found in two images may be represented by substantially the same number of pixels in each image. The aircraft 100 may also or instead have substantially no pitch, roll, and/or yaw while the images and/or video are captured. As used herein, "substantially" refers to a change of less than 5% while the images and/or video are captured.

The images and/or video may be transmitted to a computing system 120 on the aircraft 100. In another example, the computing system 120 may be located on the ground (e.g., in a control station) in communication with an on-board computing system. The computing system may be or include one or more processors; and a memory system. The memory system includes one or more non-transitory computer-readable media storing instructions that, when executed by at least one of the one or more processors, cause the computing system to perform operations. The operations are described below with respect to FIG. 2.

Figure 2:
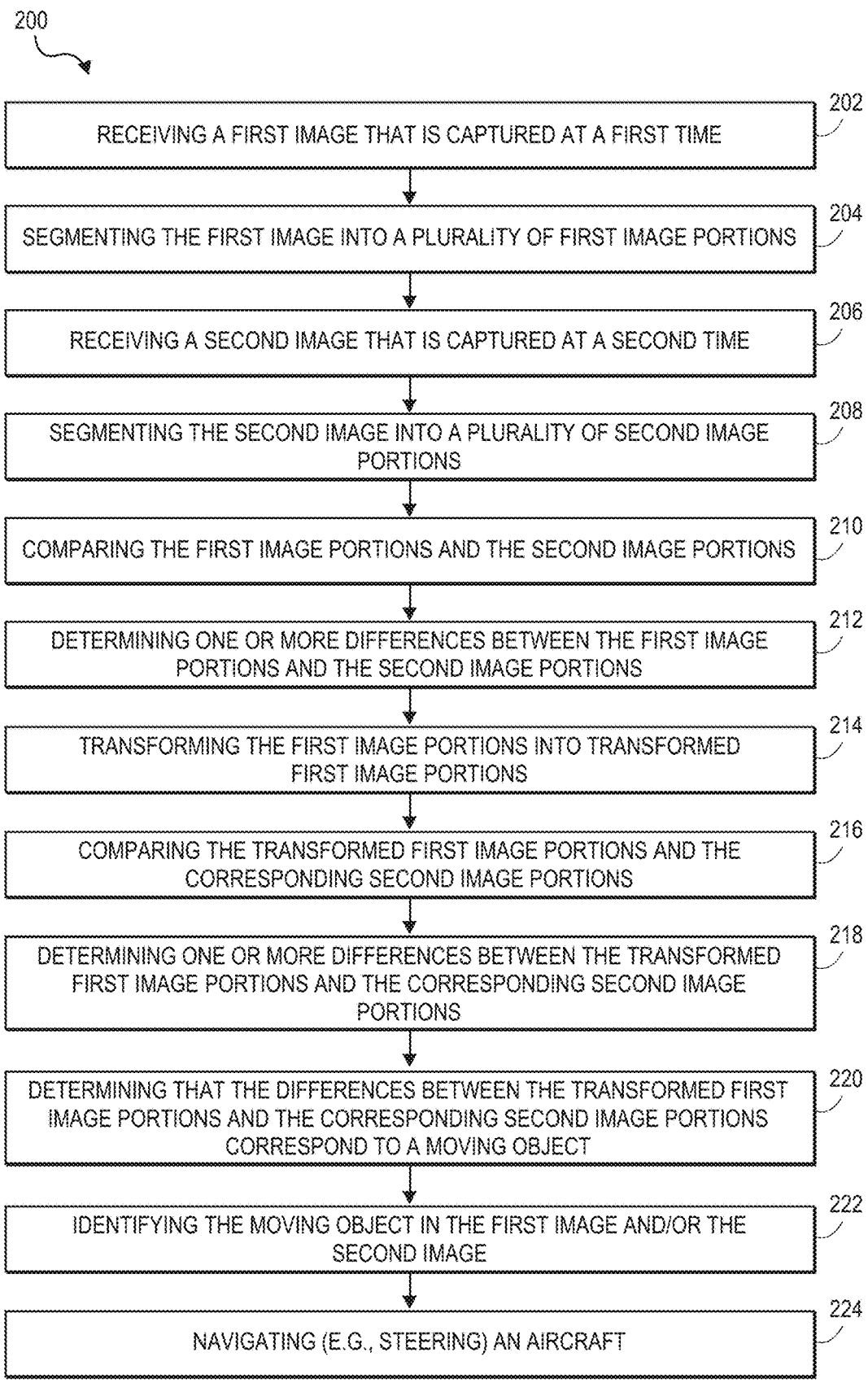
FIG. 2 illustrates a flowchart of a method for identifying a moving object in an image or video frame that is captured by a moving camera, according to an example.

FIG. 2 illustrates a flowchart of a method 200 for identifying a moving object, according to an example. More particularly, the method 200 may be used to identify a moving object in an image or video that is captured by a moving camera. An illustrative order of the method 200 is described below. One or more steps of the method 200 may be performed in a different order, repeated, or omitted.

Figure 3:
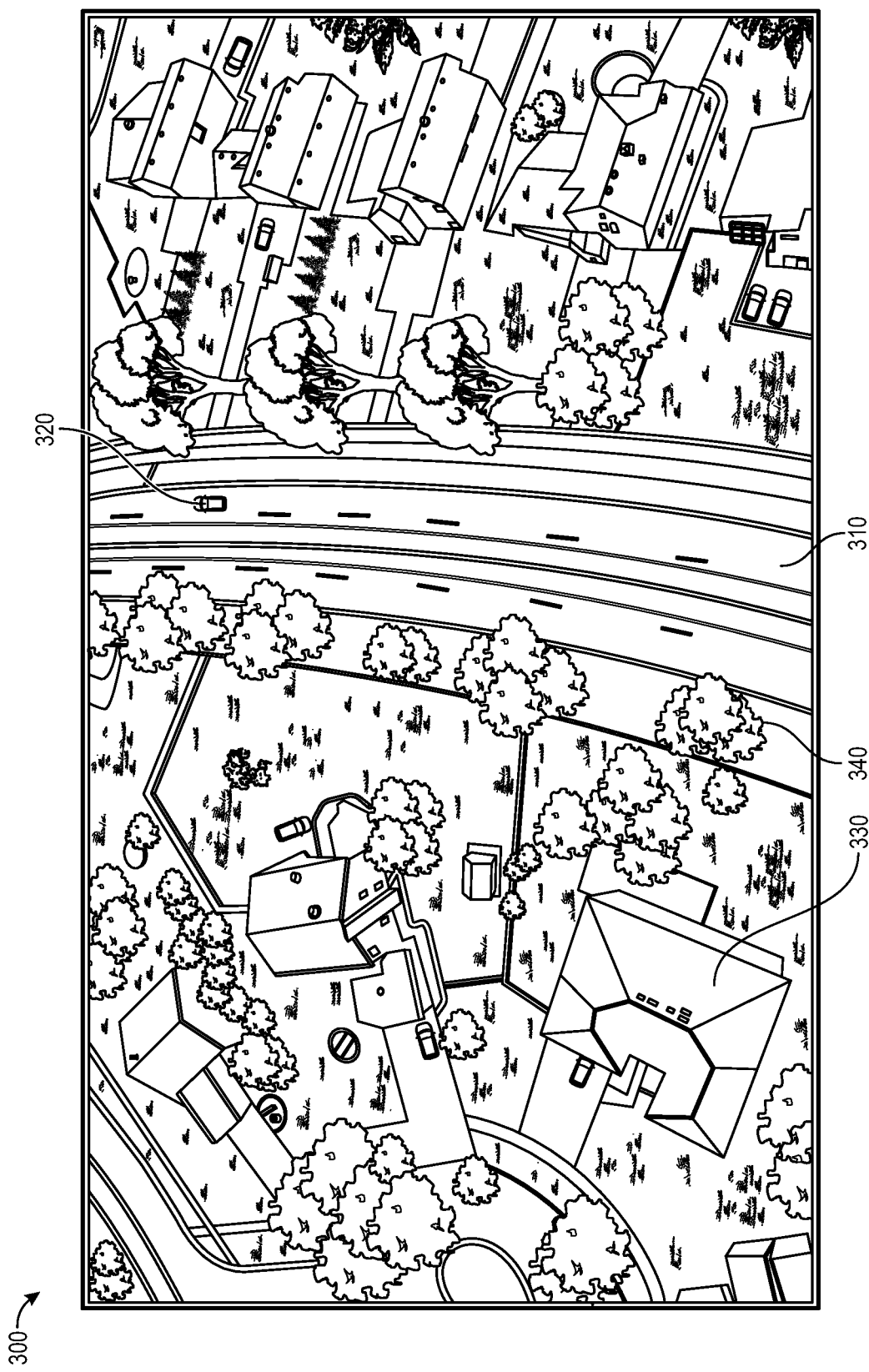
FIG. 3 illustrates a first image captured by a camera on the aircraft in flight, according to an example.

The method 200 may include receiving or identifying a first image that is captured at a first time, as at 202. An example of the first image 300 is shown in FIG. 3. The first image 300 may be captured by the camera 110 and transmitted to/received by the computing system 120. The camera 110 may be pointed downward such that the first image 300 is below the aircraft 100. The first image 300 may be a color image that is then converted to grayscale. The first image 300 may include a ground region. In one example, the first image 300 may not include a sky region. This particular first image 300 includes a road 310, a vehicle 320, one or more houses (one is labelled: 330), and one or more trees (one is labelled: 340).

Figure 4:
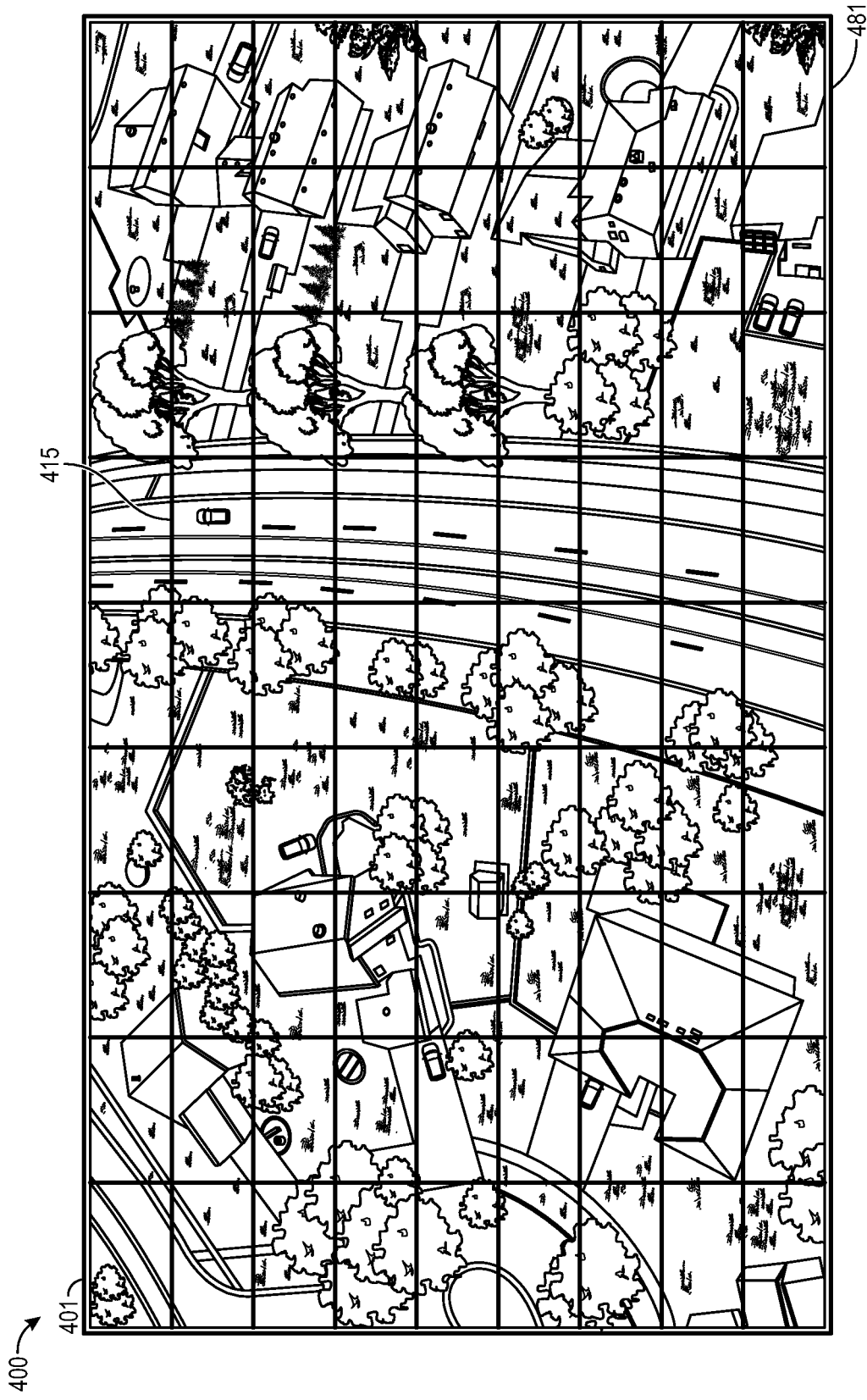
FIG. 4 illustrates the first image after being segmented into a plurality of first image portions, according to an example.

The method 200 may also include segmenting the first image 300 into a plurality of first image portions 401-481, as at 204. This is shown in FIG. 4. This step may be performed by the computing system 120. In this particular example, the first image 300 has been segmented into nine rows and nine columns. Thus, there are 81 first image portions 401-481. However, as will be appreciated, the number of portions may be varied by a user. The first image portion 415 includes the vehicle 320.

Figure 5:
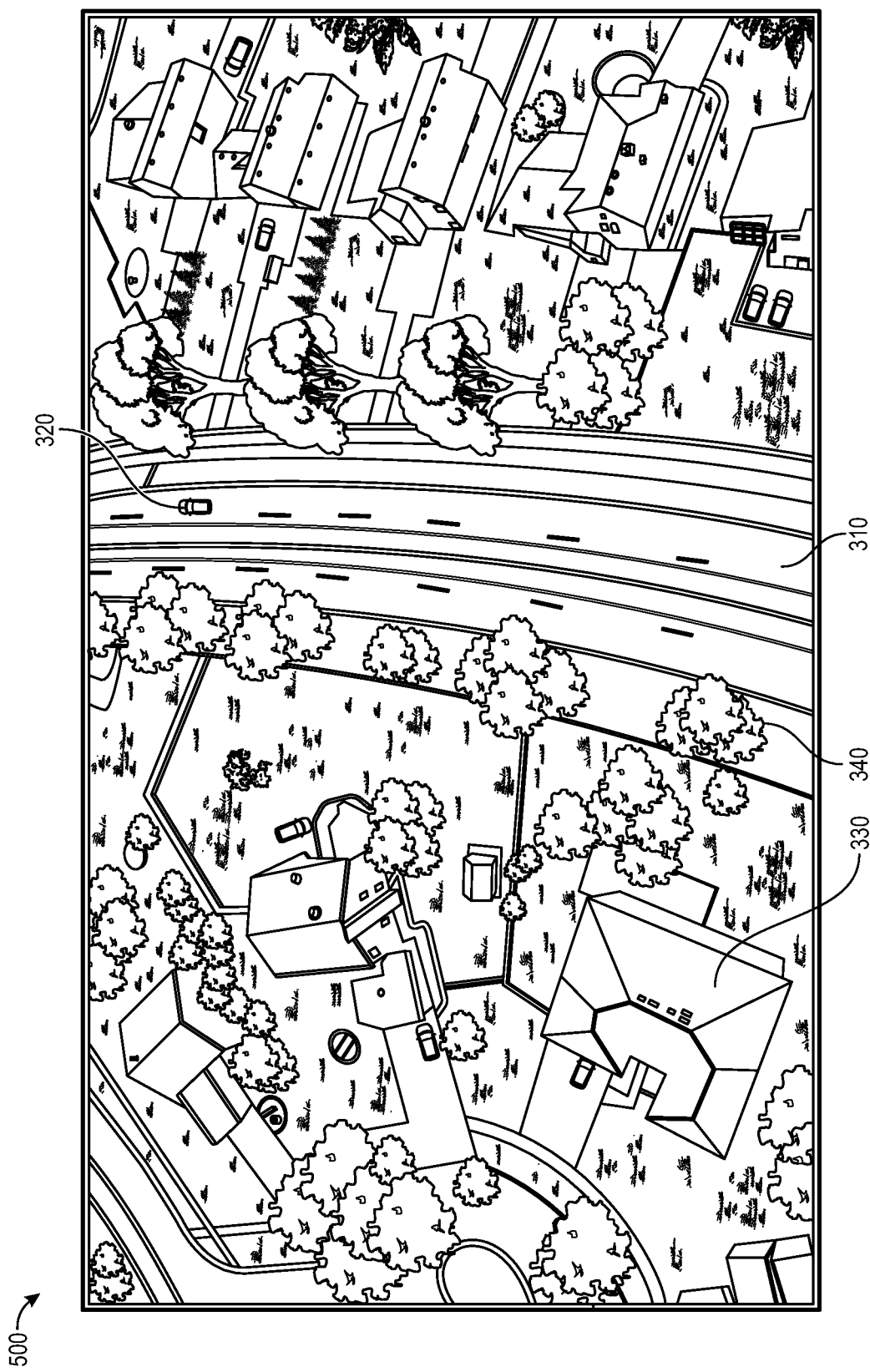
FIG. 5 illustrates a second image captured by the camera on the aircraft in flight, according to an example.

The method 200 may also include receiving or identifying a second image that is captured at a second time, as at 206. An example of the second image 500 is shown in FIG. 5. The second image 500 may be captured by the camera 110 and transmitted to/received by the computing system 120. The camera 110 may be pointed downward such that the second image 500 is below the aircraft 100. The second time may be after the first time. For example, the second time may be from about 0.01 seconds to about 0.1 seconds after the first time, about 0.1 seconds to about 0.5 seconds after the first time, about 0.5 seconds to about 1 second after the first time, about 1 second to about 5 seconds after the first time, or greater than 5 seconds after the first time. Thus, the second image 500 may also include the ground region with the road 310, the vehicle 320, the houses 330, and the trees 340.

In another example, the second time may be before the first time (i.e., the second image may be captured before the first image). For example the second time may be from about 0.01 seconds to about 0.1 seconds before the first time, about 0.1 seconds to about 0.5 seconds before the first time, about 0.5 seconds to about 1 second before the first time, about 1 second to about 5 seconds before the first time, or greater than 5 seconds before the first time.

Figure 6:
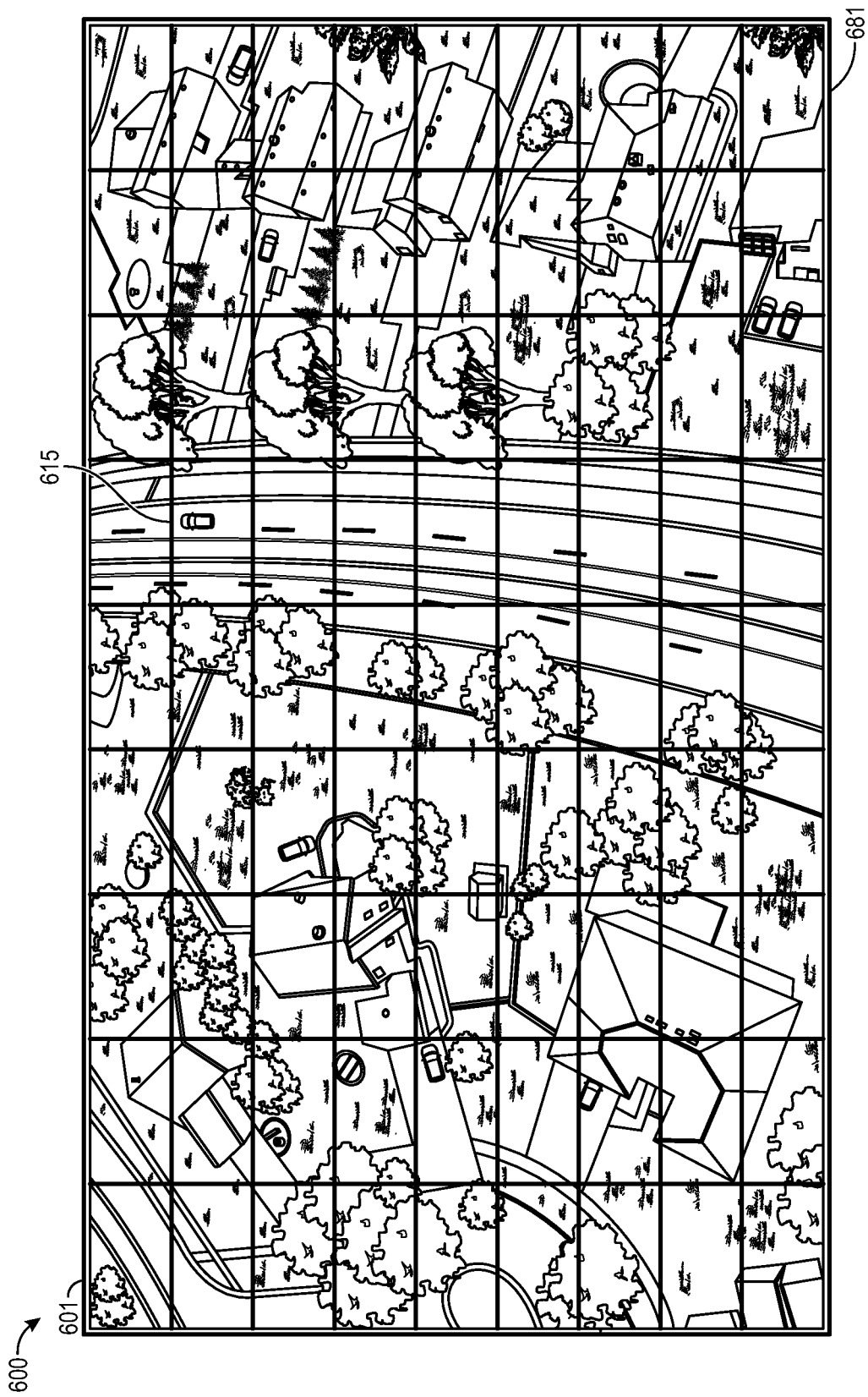
FIG. 6 illustrates the second image after being segmented into a plurality of second image portions, according to an example.

The method 200 may also include segmenting the second image 500 into a plurality of second image portions 601-681, as at 208. This is shown in FIG. 6. This step may be performed by the computing system 120. The second image 500 may be segmented into the same number of image portions as the first image 300. Thus, in this example, the second image 500 has been segmented into 81 second image portions 601-681. The second image portion 615 corresponds to the first image portion 415. For example, both the first and second image portions 415, 615 are in the sixth column from the left and in the second row from the top, and both the first and second image portions 415, 615 include the vehicle 320. However, as described below, the location of the vehicle 320 in the second image portion 615 is slightly different from that in the first image portion 415 because the vehicle 320 is moving, and the second image 500 is captured (e.g., 1 second) after the first image 300 is captured.

Figure 7:
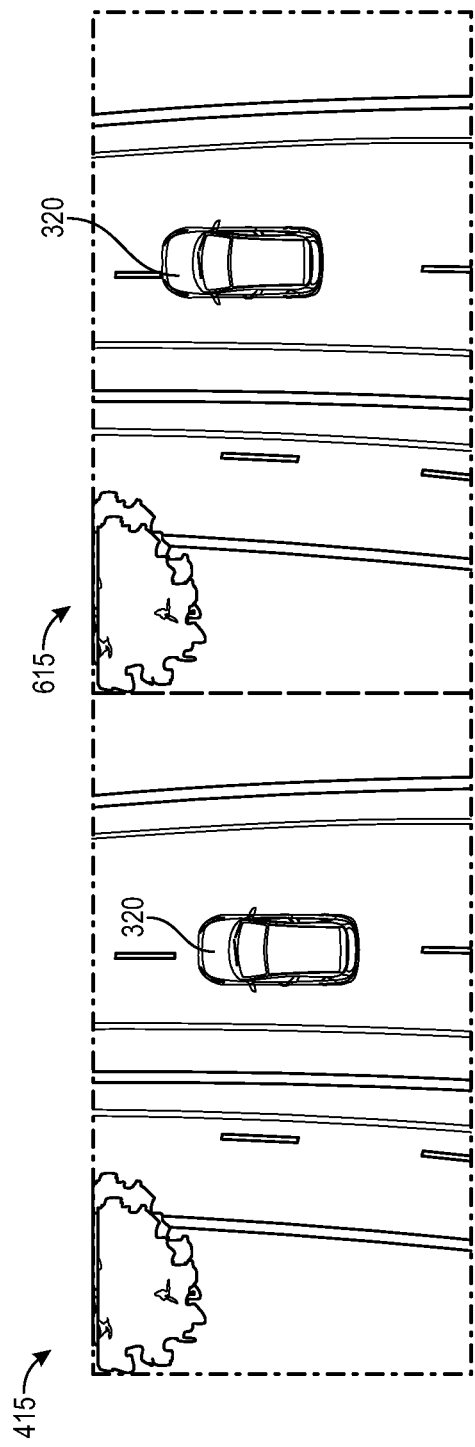
FIG. 7 illustrates one of the first image portions compared to a corresponding one of the second image portions, according to an example.

The method 200 may also include comparing the first image portions 401-481 and the second image portions 601-681, as at 210. This step may be performed by the computing system 120. In this particular example, each of the first image portions 401-481 may be compared to its corresponding second image portion 601-681. For example, the first image portion 415 may be compared to the second image portion 615. This is shown in FIG. 7. As may be seen, the vehicle 320 has moved slightly forward/upward in the second image portion 615. The vehicle 320 is blurry in FIG. 7 because FIG. 7 represents a zoomed-in version of portions of FIGS. 4 and 6; however, the vehicle 320 is still represented by the same number of pixels.

The method 200 may also include determining one or more differences between the first image portions 401-481 and the second image portions 601-681, as at 212. This step may be performed by the computing system 120. In this particular example, this step may include determining one or more differences between the first image portions 401-481 and their corresponding second image portion 601-681. For example, a difference may be determined between the first image portion 415 and the second image portion 615. As shown in FIG. 7, the difference may be that the vehicle 320 has moved forward/upward from the first image portion 415 to the second image portion 615. The difference may be determined based at least partially upon the comparison (from step 210). The difference may be or include an affine translation.

Figure 8:
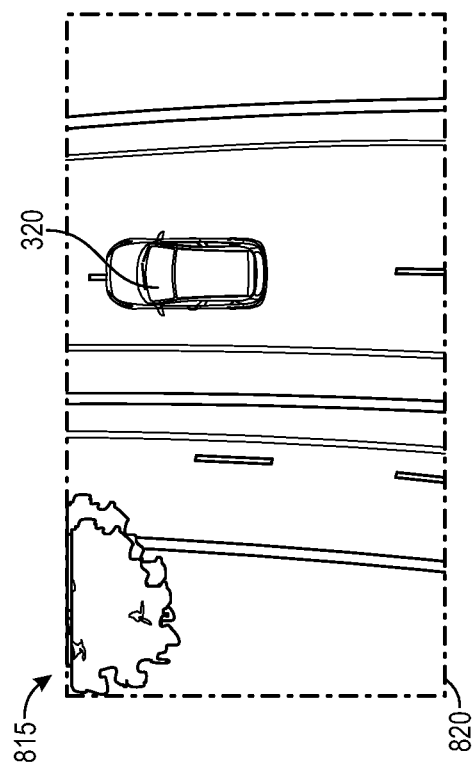
FIG. 8 illustrates the first image portion transformed into a transformed first image portion, according to an example.

The method 200 may also include transforming the first image portions 401-481 into transformed first image portions, as at 214. This step may be performed by the computing system 120. In this particular example, this step may include transforming one or more of the first image portions 401-481 into transformed first image portion(s) based at least partially upon the difference(s) (from step 212). For example, the first image portion 415 may be transformed into a transformed first image portion 815 based at least partially upon the difference. This is shown in FIG. 8.

The transformed first image portion 815 may be a prediction/estimation of the second image 500 (and/or second image frame) at the second time that is based upon the first image portion 415 and the determined difference. As the affine translation from the first image portion 415 to the second image portion 615 is forward/upward, the transformed first image portion 815 represents the first image portion 415 shifted upward, resulting in the black portion 820 at the bottom of FIG. 8. Said another way, the first image portion 415 is shifted upward to match the frame of the second image portion 615. As the first image portion 415 does not provide any information about the pixels left empty by its shift, these pixels are left black, resulting in the black portion 820 at the bottom of FIG. 8.

As will be appreciated, when the first image is captured before the second image (i.e., the first time is before the second time), then the transformation will be forward in time. When the first image 300 is captured after the second image 500 (i.e., the first time is after the second time), then the transformation will be backward in time.

In at least one example, each of the first image portions 401-481 may be transformed based at least partially upon a difference found between a single pair of image portions (e.g., 415, 615). For example, the first image portions 401, 402, 403, etc. may be transformed based at least partially upon the difference found between the image portions 415, 615. In another example, each of the first image portions 401-481 may be transformed based at least partially upon a difference between itself and its corresponding second image portion 601-681. For example, the first image portion 401 may be transformed based at least partially upon the difference between itself and the second image portion 601, the first image portion 402 may be transformed based at least partially upon the difference between itself and the second image portion 602, etc.

The method 200 may also include comparing the transformed first image portions and the corresponding second image portions, as at 216. This step may be performed by the computing system 120. This may include comparing one of the transformed first image portions (e.g., portion 815) and the corresponding second image portion (e.g., portion 615). For example, this may include overlaying one of the transformed first image portions (e.g., portion 815) and the corresponding second image portion (e.g., portion 615), or vice versa. In another example, this may instead include combining the transformed first image portions (e.g., including all 81 of the transformed first image portions) to product a transformed first image and then comparing the transformed first image and the second image 500. For example, this may include overlaying the transformed first image onto the second image 500, or vice versa, to produce a combined image. The combined image 900 is shown in FIG. 9.

The method 200 may also include determining one or more differences between the transformed first image portions and the corresponding second image portions, as at 218. This step may be performed by the computing system 120. This may include identifying an area (e.g., one or more pixels) 910 in the combined image 900 where the transformed first image portions differ from the corresponding second image portions by more than a predetermined amount/threshold.

Figure 9:
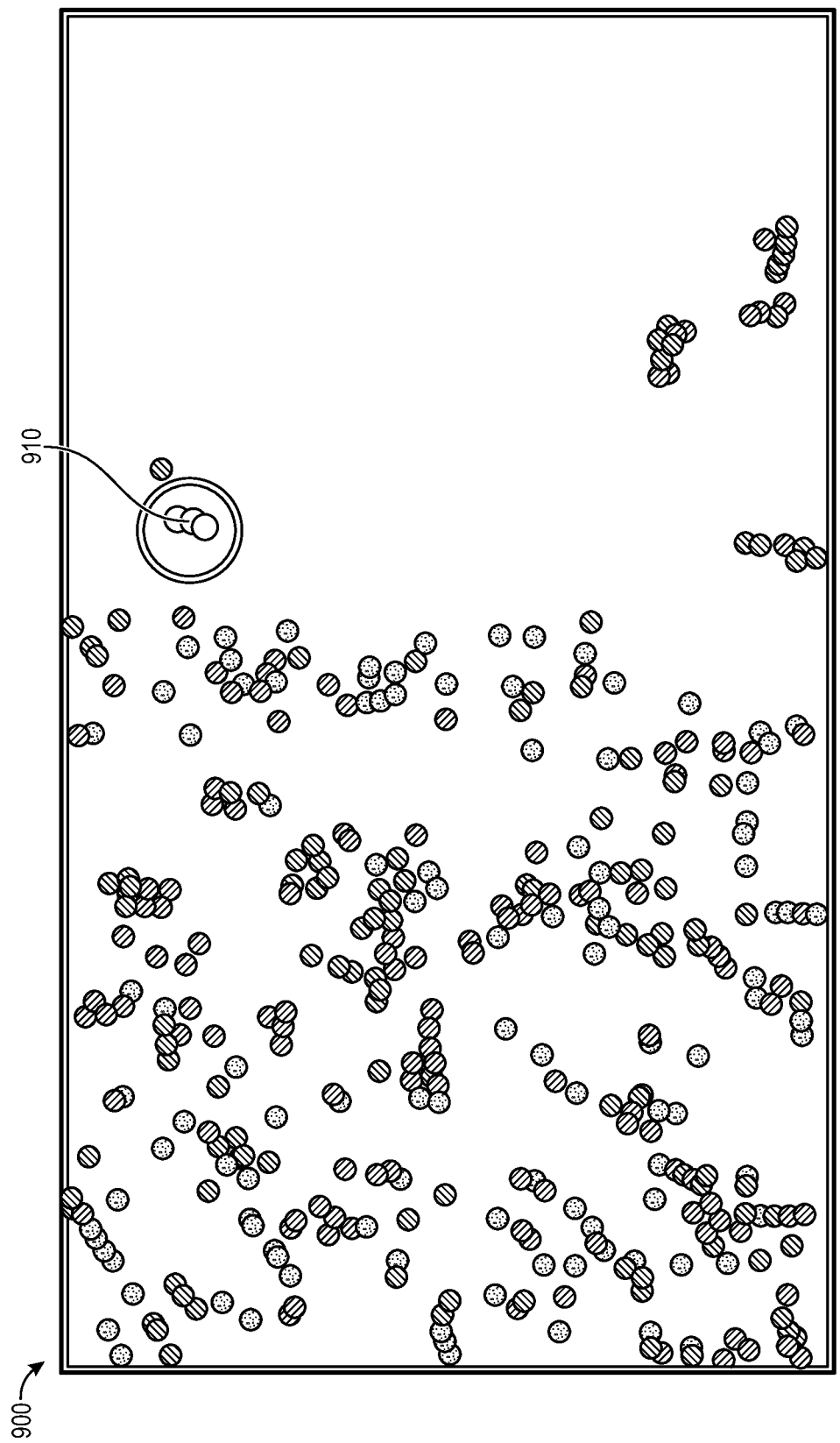
FIG. 9 illustrates a third image that represents a comparison of the transformed image portion and the second image portion, according to an example.

In the example shown in FIG. 9, the combined image 900 may be greyscale. The darker pixels represent little (or no) difference between the transformed first image and the second image 500. The lighter pixels represent greater differences between the transformed first image and the second image 500. For example, the pixels identified at 910 represent the greatest difference between the transformed first image and the second image 500. While greyscale gradation is shown in FIG. 9, the degree of differences between the pixel(s) of the transformed first image and the second image 500 may be represented differently. It may be illustrated graphically with various color gradations, such as greyscale. In some examples, the degree of differences may be represented or identified by assigning numerical values to the pixel(s).

Figure 10:
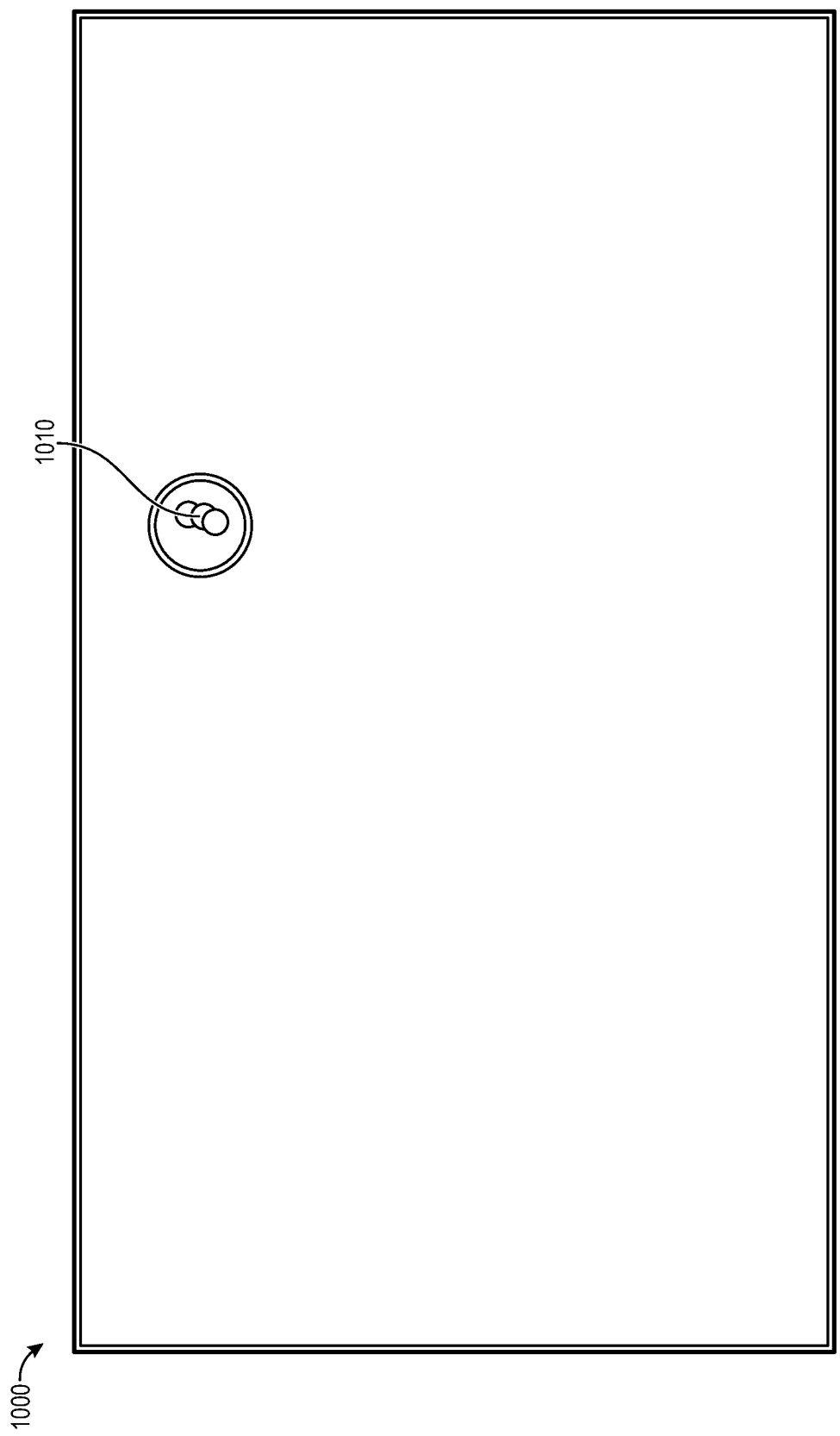
FIG. 10 illustrates the third image converted to binary form and showing one or more pixels that differ between the transformed image portion and the second image portion, according to an example.

In at least one example, the combined image 900 may be converted into a binary image 1000, as shown in FIG. 10. In the binary image 1000, the pixels that represent a difference (e.g., between the transformed first image and the second image 500) that is less than the predetermined amount/threshold may be assigned one color (e.g., black), and the pixels that represent a difference that is greater than the predetermined amount/threshold may be assigned another color (e.g., white). Thus, the area 1010 in the binary image 1000 more clearly represents where the transformed first image differs from the second image 500 by more than the predetermined amount/threshold.

Figure 11:
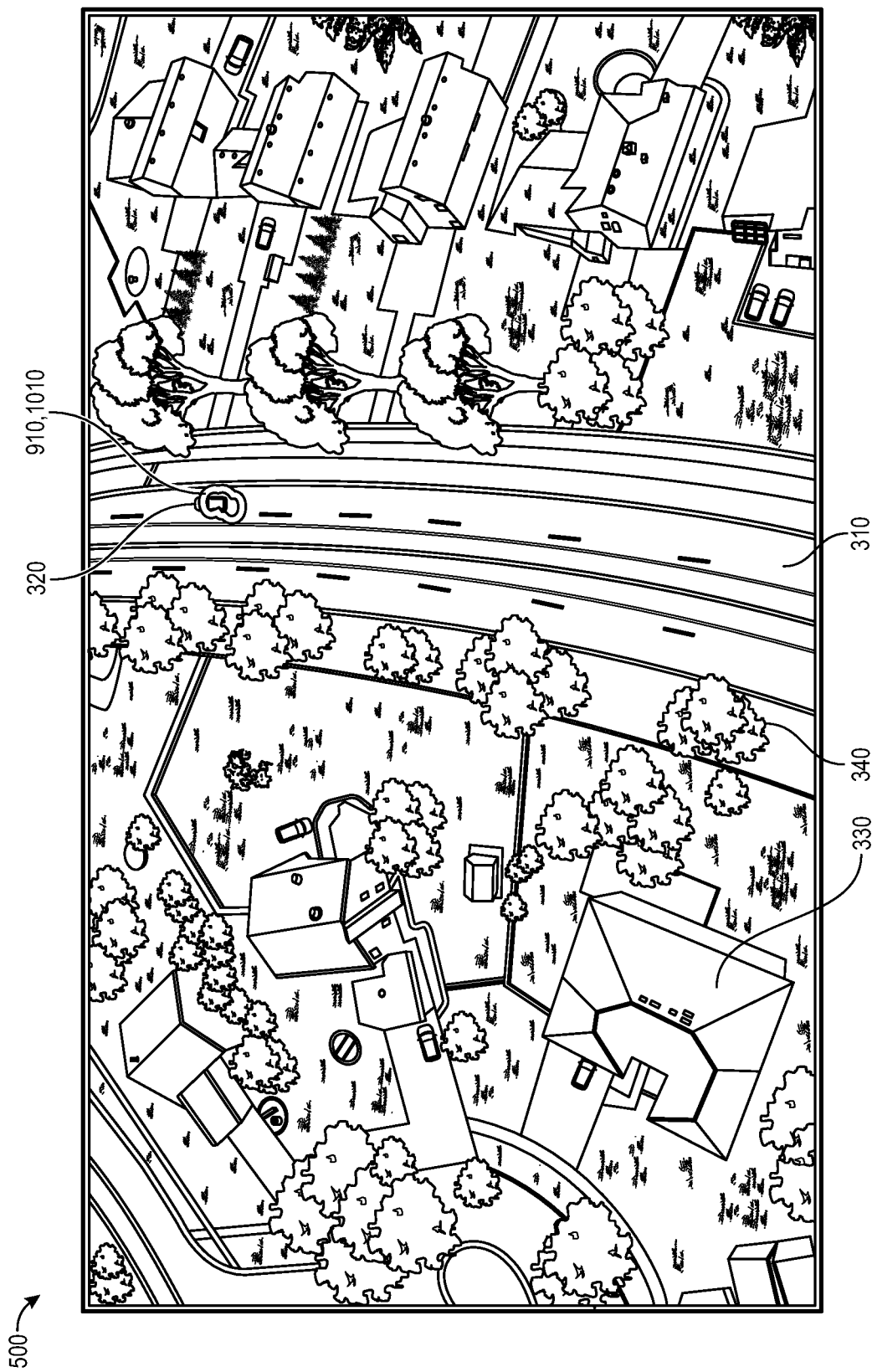
FIG. 11 illustrates the second image with the one or more pixels (from the third image) identified, according to an example.

The method 200 may also include determining that the differences between the transformed first image portions and the corresponding second image portions (e.g., the area 910, 1010) correspond to a moving object, as at 220. This step may be performed by the computing system 120. The method 200 may also include identifying the moving object in the first image 300 and/or the second image 500, as at 222. This is shown in FIG. 11. This step may be performed by the computing system 120. For example, even though the aircraft 100 and the camera 110 are both moving, the method 200 may be able to determine that the area 910, 1010 represents an object (e.g., the vehicle 320) that is moving in comparison to the rest of the ground region (e.g., the road 310, the houses 330, and the trees 340). In at least one example, identifying the moving object may also or instead include determining what the object is (e.g., a vehicle 320) using an object recognition algorithm. Although shown as a car, the moving object 320 may also or instead be or include any moving (e.g., flying) object, such as an airplane, a helicopter, an unmanned aerial vehicle (e.g., a drone or satellite), a spacecraft, a flock of birds, a swarm of insects, or the like.

In one example, the method 200 may include navigating (e.g., steering) the aircraft 100, as at 224. The aircraft 100 may be navigated (e.g., steered) based at least partially upon the area 910 in the combined image 900, the area 1010 in the binary image 1000, the moving object 320 in the first image 300, the moving object 320 in the second image 500, or a combination thereof. For example, the aircraft 100 may be steered to chart a course away from the moving object 320, to avoid an unsafe distance or a collision. The navigation may be performed (e.g., automatically) by the computing system 120. In another example, the navigation may be performed by a user. The user may be in the aircraft 100 (e.g., a pilot), or the user may be on the ground and steering the aircraft 100 remotely.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Similarly, the terms "bonded" and "bonding" refer to "directly bonded to" or "bonded to via one or more intermediate elements, members, or layers."

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more example s, alterations and/or modifications can be made to the illustrated examples without departing from the spirit and scope of the appended claims. In addition, while a particular feature of the present teachings may have been disclosed with respect to only one of several example s, such feature may be combined with one or more other features of the other example s as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

Clause 1: A method, comprising: identifying a first image that is captured at a first time; segmenting the first image into a plurality of first image portions; identifying a second image that is captured at a second time; segmenting the second image into a plurality of second image portions; comparing one of the plurality of first image portions and a corresponding one of the plurality of second image portions; determining a difference between the first image and the second image based at least partially upon the comparison; and transforming the first image into a transformed first image based at least partially upon the difference.

Clause 2: The method of Clause 1, wherein the first and second images are captured by a camera on an aircraft in flight, and wherein the first image is captured before the second image.

Clause 3: The method of Clause 1 or 2, wherein the first and second images are captured by a camera on an aircraft in flight, and wherein the first image is captured after the second image.

Clause 4: The method of any of Clauses 1-3, wherein the camera is pointed substantially straight down, and wherein the first and second images consist of a ground region.

Clause 5: The method of any of Clauses 1-4, wherein the difference comprises an affine translation.

Clause 6: The method of any of Clauses 1-5, wherein the transformed first image comprises a prediction of what the second image will look like at the second time based at least partially upon the first image and the difference.

Clause 7: The method of any of Clauses 1-6, further comprising comparing the transformed first image and the second image, wherein comparing the transformed first image and the second image comprises identifying a pixel in the transformed first image that differs from a corresponding pixel in the second image by more than a predetermined amount.

Clause 8: The method of Clause 7, further comprising determining that the pixel and the corresponding pixel represent a moving object.

Clause 9: The method of Clause 8, further comprising tracking the moving object based at least partially upon directions of movement of the pixel and the corresponding pixel.

Clause 10: The method of Clause 8, further comprising causing a camera to steer based at least partially upon the moving object.

Clause 11: A computing system comprising: one or more processors; and a memory system comprising one or more non-transitory computer-readable media storing instructions that, when executed by at least one of the one or more processors, cause the computing system to perform operations, the operations comprising: identifying a first image that is captured at a first time, wherein the first image is captured by a camera on an aircraft in flight; segmenting the first image into a plurality of first image portions; identifying a second image that is captured at a second time, wherein the second image is captured by the camera on the aircraft in flight; segmenting the second image into a plurality of second image portions; comparing one of the plurality of first image portions and a corresponding one of the plurality of second image portions; determining an affine translation between the one of the plurality of first image portions and the corresponding one of the plurality of second image portions based at least partially upon the comparison; transforming the one of the plurality of first image portions into a transformed first image portion based at least partially upon the affine translation; identifying a pixel in the transformed first image portion that differs from a corresponding pixel in the corresponding one of the plurality of second image portions by more than a predetermined amount; and determining that the pixel and the corresponding pixel represent a moving object.

Clause 12: The computing system of Clause 11, wherein the camera is pointed substantially straight down, and wherein the first and second images consist of a ground region.

Clause 13: The computing system of Clause 11 or 12, wherein the second time is after the first time, and wherein a time difference between the first and second times is less than 10 seconds.

Clause 14: The computing system of any of Clauses 11-13, wherein the transformed first image portion comprises a prediction of what the corresponding one of the second image portions will look like at the second time based at least partially upon the one of the first image portions and the affine translation.

Clause 15: The computing system of any of Clauses 11-14, wherein the operations further comprise causing the aircraft to navigate based at least partially upon the moving object.

Clause 16: A computing system comprising: one or more processors; and a memory system comprising one or more non-transitory computer-readable media storing instructions that, when executed by at least one of the one or more processors, cause the computing system to perform operations, the operations comprising: identifying a first image that is captured at a first time, wherein the first image is captured by a camera on a first aircraft in flight, and wherein the camera is pointed substantially straight down at a ground region below the first aircraft; segmenting the first image into a plurality of first image portions; identifying a second image that is captured at a second time, wherein the second image is captured by the camera on the first aircraft in flight, wherein the second time is after the first time, and wherein a time difference between the first and second times is less than 10 seconds; segmenting the second image into a plurality of second image portions; comparing one of the plurality of first image portions and a corresponding one of the plurality of second image portions; determining an affine translation between the one of the plurality of first image portions and the corresponding one of the plurality of second image portions based at least partially upon the comparison; transforming the first image into a transformed first image based at least partially upon the affine translation, wherein the transformed first image comprises a prediction of what the second image will look like based at least partially upon the first image and the affine translation; combining the transformed first image and the second image to produce a combined image; identifying an area in the combined image that represents a difference between the transformed first image and the second image, wherein the difference is greater than a predetermined amount; and identifying the area in the first image, the second image, or both.

Clause 17: The computing system of Clause 16, wherein the aircraft has substantially no pitch, roll, and yaw while the first image and the second image are captured.

Clause 18: The computing system of Clause 16 or 17, wherein the operations further comprise converting the combined image into a binary image, wherein the area in the binary image is represented by a first color, and wherein a remainder of the binary image is represented by a second, different color.

Clause 19: The computing system of any of Clauses 16-18, wherein the operations further comprise determining that the area represents a moving object that is below the aircraft.

Clause 20: The computing system of Clause 19, wherein the operations further comprise causing the aircraft to navigate based at least partially upon a trajectory of the moving object.

What is claimed is:

1. A method, comprising:
identifying a first image that is captured at a first time;
identifying a second image that is captured at a second time;
segmenting the first image into a plurality of first image portions, wherein the first and second images are captured by a camera on an aircraft in flight, wherein a variation of the aircraft, the camera, or both between the first image and the second image causes image distortion when comparing the first image as a whole and the second image as a whole;
segmenting the second image into a plurality of second image portions;
determining a phase correlation between one of the plurality of first image portions and a corresponding one of the plurality of second image portions, wherein the phase correlation is due to the image distortion;
comparing one of the plurality of first image portions and a corresponding one of the plurality of second image portions;
determining a difference between the first image and the second image based at least partially upon the comparison between the one of the plurality of first image portions and the corresponding one of the plurality of second image portions;
transforming the first image into a transformed first image based at least partially upon the difference; and
navigating an aircraft based upon the transformed first image.

2. The method of claim 1, wherein the first image is captured before the second image.

3. The method of claim 1, wherein the first image is captured after the second image.

4. The method of claim 1, wherein the camera is pointed substantially straight down, and wherein the first and second images consist of a ground region.

5. The method of claim 1, wherein the difference comprises an affine translation.

6. The method of claim 1, wherein the transformed first image comprises a prediction of what the second image will look like at the second time based at least partially upon the first image and the difference.

7. The method of claim 1, further comprising comparing the transformed first image and the second image, wherein comparing the transformed first image and the second image comprises identifying a pixel in the transformed first image that differs from a corresponding pixel in the second image by more than a predetermined amount.

8. The method of claim 7, further comprising determining that the pixel in the transformed first image and the corresponding pixel in the second image represent a moving object.

9. The method of claim 8, further comprising tracking the moving object based at least partially upon directions of movement of the pixel and the corresponding pixel.

10. The method of claim 8, wherein the aircraft is navigated away from the moving object.

11. A computing system comprising:
one or more processors; and
a memory system comprising one or more non-transitory computer-readable media storing instructions that, when executed by at least one of the one or more processors, cause the computing system to perform operations, the operations comprising:
identifying a first image that is captured at a first time, wherein the first image is captured by a camera on an aircraft in flight;
identifying a second image that is captured at a second time, wherein the second image is captured by the camera on the aircraft in flight;
segmenting the first image into a plurality of first image portions, wherein a variation of the aircraft, the camera, or both between the first image and the second image causes image distortion when comparing the first image as a whole and the second image as a whole, wherein the variation is in a distance between the aircraft and a ground, an attitude of the aircraft, a rotation of the aircraft, an angle of the camera, or a combination thereof, and wherein the image distortion causes an object in the first and second images to appear to move when the objects are actually stationary;
segmenting the second image into a plurality of second image portions;
determining a phase correlation between one of the plurality of first image portions and a corresponding one of the plurality of second image portions, wherein the phase correlation is due to the image distortion;
comparing the one of the plurality of first image portions and the corresponding one of the plurality of second image portions based at least partially upon the phase correlation;
determining an affine translation between the one of the plurality of first image portions and the corresponding one of the plurality of second image portions based at least partially upon the comparison;
transforming the one of the plurality of first image portions into a transformed first image portion based at least partially upon the affine translation;
identifying a pixel in the transformed first image portion that differs from a corresponding pixel in the corresponding one of the plurality of second image portions by more than a predetermined amount;
determining that the pixel in the transformed first image and the corresponding pixel in the corresponding one of the plurality of second image portions represent a moving object; and
causing the aircraft to navigate based at least partially upon the moving object.

12. The computing system of claim 11, wherein the camera is pointed substantially straight down, and wherein the first and second images consist of a ground region.

13. The computing system of claim 11, wherein the second time is after the first time, and wherein a time difference between the first and second times is less than 10 seconds.

14. The computing system of claim 11, wherein the transformed first image portion comprises a prediction of what the corresponding one of the second image portions will look like at the second time based at least partially upon the one of the first image portions and the affine translation.

15. A computing system comprising:
one or more processors; and
a memory system comprising one or more non-transitory computer-readable media storing instructions that, when executed by at least one of the one or more processors, cause the computing system to perform operations, the operations comprising:
- identifying a first image that is captured at a first time, wherein the first image is captured by a camera on a first aircraft in flight, and wherein the camera is pointed substantially straight down at a ground region below the first aircraft;
- identifying a second image that is captured at a second time, wherein the second image is captured by the camera on the first aircraft in flight, wherein the second time is after the first time, and wherein a time difference between the first and second times is less than 10 seconds, wherein a variation of the first aircraft, the camera, or both between the first image and the second image causes image distortion when comparing the first image as a whole and the second image as a whole, wherein the variation is in a distance between the first aircraft and a ground, an attitude of the first aircraft, a rotation of the first aircraft, an angle of the camera, or a combination thereof, and wherein the image distortion causes an object in the first and second images to appear to move when the objects are actually stationary;
- segmenting the first image into a plurality of first image portions;
- segmenting the second image into a plurality of second image portions;
- determining a phase correlation between one of the plurality of first image portions and a corresponding one of the plurality of second image portions, wherein the phase correlation is due to the image distortion;
- comparing the one of the plurality of first image portions and the corresponding one of the plurality of second image portions based at least partially upon the phase correlation;
- determining an affine translation between the one of the plurality of first image portions and the corresponding one of the plurality of second image portions based at least partially upon the comparison;
- transforming the first image into a transformed first image based at least partially upon the affine translation, wherein the transformed first image comprises a prediction of what the second image will look like based at least partially upon the first image and the affine translation;
- combining the transformed first image and the second image to produce a combined image;
- identifying an area in the combined image that represents a difference between the transformed first image and the second image, wherein the difference is greater than a predetermined amount;
- identifying the area in the first image, the second image, or both; and
- causing the aircraft to navigate based at least partially upon the area.

16. The computing system of claim 15, wherein the aircraft has substantially no pitch, roll, and yaw while the first image and the second image are captured.

17. The computing system of claim 15, wherein the operations further comprise converting the combined image into a binary image, wherein the area in the binary image is represented by a first color, and wherein a remainder of the binary image is represented by a second, different color.

18. The computing system of claim 15, wherein the operations further comprise determining that the area represents a moving object that is below the aircraft.

19. The computing system of claim 18, wherein the operations further comprise causing the aircraft to navigate based at least partially upon a trajectory of the moving object.

20. The method of claim 1, wherein the second time is before the first time such that the transformation is backwards in time.

21. The method of claim 1, wherein each of the first image portions is transformed based upon a difference between a single pair of one of the first image portions and one of the second image portions.

22. The method of claim 1, wherein each of the first image portions is transformed based upon a difference between itself and its corresponding second image portion.

23. The method of claim 8, wherein the moving object comprises a flying object, and wherein the aircraft is navigated away from the flying object.

24. The method of claim 1, wherein the variation is in a distance between the aircraft and a ground, an attitude of the aircraft, a rotation of the aircraft, an angle of the camera, or a combination thereof.

25. The method of claim 1, wherein the image distortion causes an object in the first and second images to appear to move when the objects are actually stationary.

26. The method of claim 1, wherein the comparison is based at least partially upon the phase correlation.

* * * * *